UNITED STATES PATENT OFFICE.

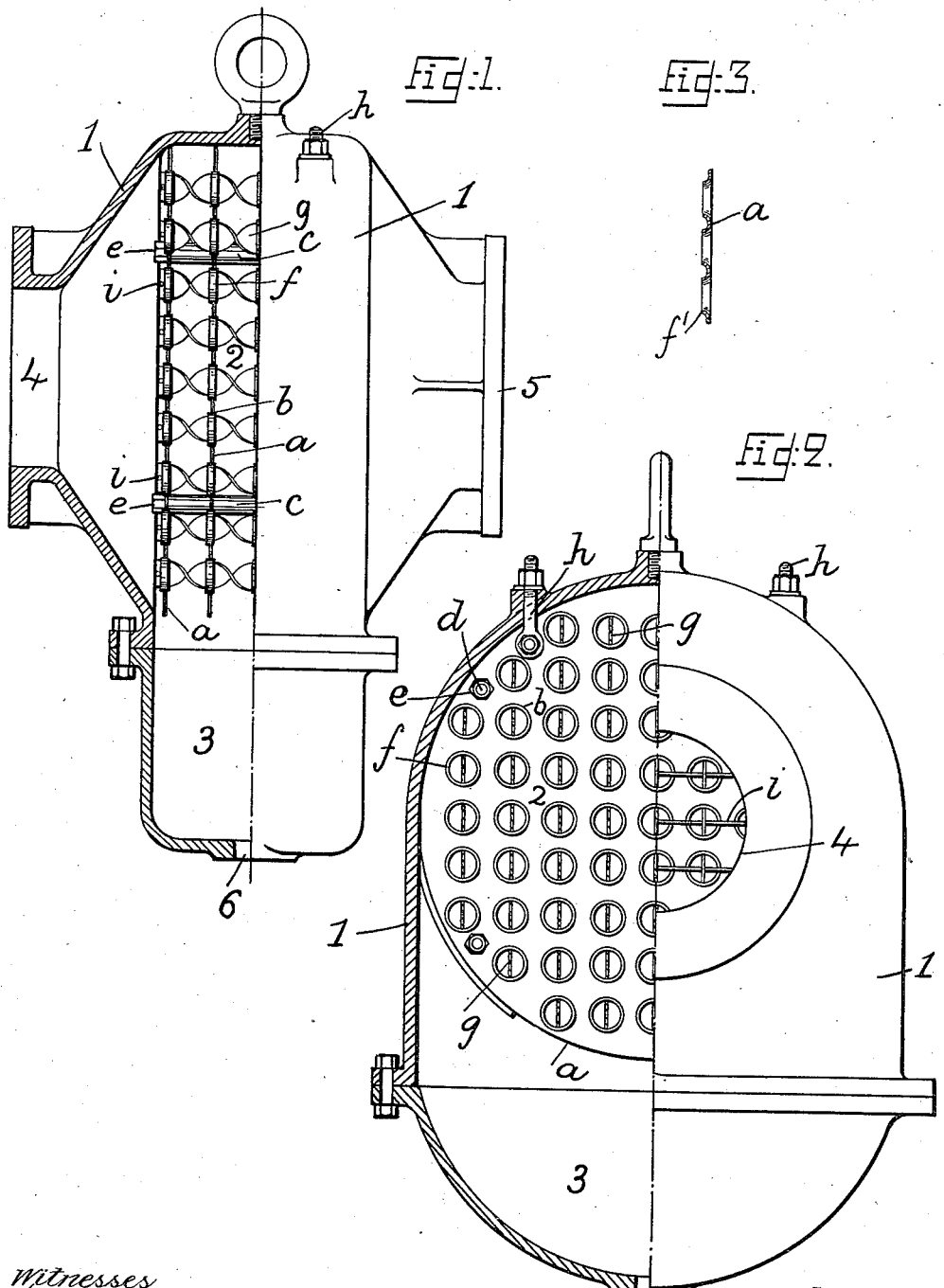

WILLIAM HENRY YARDLEY, OF SHEFFIELD, ENGLAND.

APPARATUS FOR TREATING STEAM AND OTHER GASEOUS OR LIQUID BODIES.

1,027,962.    Specification of Letters Patent.    Patented May 28, 1912.

Application filed April 7, 1911. Serial No. 619,544.

*To all whom it may concern:*

Be it known that I, WILLIAM HENRY YARDLEY, a subject of the King of Great Britain and Ireland, and a resident of Sheffield, Yorkshire, England, have invented certain new and useful Improvements in Apparatus for Treating Steam and other Gaseous or Liquid Bodies; and I do hereby declare the following to be a full, clear, and exact description of the same.

This invention relates to improved apparatus for treating steam and other gaseous bodies and liquid bodies for removing impurities therefrom, and which, while being particularly suitable for the separation of oil, water, grit, and the like, from exhaust steam, is also suitable, for example, for the separation of such impurities as oil, or dust, from compressed air used in driving machinery, or from air used in connection with fans, ventilators and other installations, or from gases traversing chimneys or other places, or for the separation of suspended particles from water or other liquids.

The invention has for its object to provide a more efficient device for such purpose than known devices used therefor.

The improved device is hereinafter described with reference to the accompanying drawings, in which—

Figures 1 and 2 represent as to the right hand halves elevations and as to the left hand halves sectional elevations, at right angles to one another. Fig. 3 is a sectional view through part of a transverse baffle plate.

The improved device comprises a casing 1, having an upper steam or other gas or liquid treating chamber, 2, and a lower impurity collecting chamber, 3, the chamber, 2, having an inlet, 4, and outlet, 5, for the steam or other gas or liquid to be treated, arranged at its opposite ends, and the chamber, 3, being in independent communication with the respective spaces between the plates having a suitably controlled outlet, 6, for the impurities which collect in such chamber.

Within the chamber, 2, are a plurality of vertical or approximately vertical plates, $a$, each having a plurality of through holes, $b$, preferably equidistant, which plates are spaced apart by distance pieces, $c$, and are held together by rods, $d$, and nuts, $e$, with the respective or corresponding holes, $b$, of the several plates, $a$, in alinement.

The holes, $b$, are provided with horizontal flange-like projections arranged at right angles to the plates and consisting of ferrules, $f$, inserted within the holes and projecting on each side of the plates, Fig. 1, or consisting of flanges $f^1$, projecting on one side of the plates only, Fig. 3.

A plurality of screw-like twisted strips, $g$, each of a width or diameter eual to that of the ferrules, $f$, is passed through the lines of holes so as to extend from one end plate, $a$, to the other end plate, $a$. The spaces between the plates and the lines of holes in which the twisted strips are located constitute the gas or liquid throughway.

The plates are supported in the chamber, 2, transversely to the flow of the gas or liquid from the inlet, 4, to the outlet, 5, by being suspended from bolts, $h$, passing through the top of the chamber, 2. The plates to which the bolts $h$, are applied are of a little less height than the other plates, so that by tightening the bolts the plates to which they are attached are forced in a direction thransverse to the strips, $g$, and the latter are jammed firmly in position.

$i$, represents bolts or rods passed through the front and back ends of the strips, $g$, to serve as additional means for securing them in position.

The inlet, 4, and outlet, 5, are constructed of a flared or enlarged diameter toward each other and in opposite directions to distribute the gas or liquid being treated over the whole area of the plates, $a$, which are of approximately the same diameter as the largest parts of the inlet and outlet.

In the operation of the apparatus, the steam for example, passing through the inlet, 4, into the chamber, 2, immediately comes opposite and passes through the large number of holes in the first plate, and strikes the twisted strips, which, being at an angle deflect any oil and water in the steam onto the face of the second plate. The continuous action of the steam in this way forces the deposit on the second plate into the bottom chamber, 3. It is impossible for any oil or water collected on the second plate to go forward to the next, because it is prevented from doing so by the flanges or ferrules which surround the holes, and the use of the flanges or ferrules is all important in this respect. If the first deflecting action has not abstracted all the oil or water or sediment from the steam, the next deflection onto the next plate or plates will do so, until the steam passes right through the series of plates to the outlet.

The unobstructed area of the plurality of through holes in each plate should not be less than equal to that of the smallest diameter of the steam inlet in order to avoid throttling.

The ferrules are preferably located within the holes, b, by having their ends expanded by any suitable means, which also serves to form a liquid-tight joint between the ferrules and the holes.

What I do claim as my invention and desire to secure by Letters Patent is:—

1. Apparatus for removing impurities from steam and other gaseous bodies and liquid bodies, comprising a treating chamber open at opposite ends for the entrance and exit of the gaseous or liquid body, a series of vertical plates having holes therein and spaced apart and located within the treating chamber transversely between its ends with the holes in adjacent plates in alinement, horizontal flange-like projections around the holes and normal to the plates, twisted or screw-like strips passing through the holes and flange-like projections and extending from one end plate to the other end plate, but said flange-like projections being much shorter than the distance between adjacent plates, and an impurity collecting chamber in independent communication with the respective spaces between the plates, substantially as described.

2. In apparatus for the purpose set forth, a casing having open ends, a series of vertical plates having holes therein and spaced apart and located within the casing transversely between its ends, the holes in adjacent plates being in alinement, horizontal ferrules inserted within the holes and projecting on each side of and normal to the plates, and twisted strips fitting and passing through the ferrules, substantially as described.

3. In apparatus for the purpose set forth, a casing having open ends, a series of vertical plates having holes therein and spaced apart and located within the casing transversely between its ends, the holes in adjacent plates being in alinement, horizontal flange-like projections around said holes and normal to the plates, and twisted strips passing through the holes and flange-like projections, one of said plates being forced slightly out of register in a transverse direction to locate the strips in position, substantially as described.

4. In apparatus for the purpose set forth, a casing having open ends which are flared or enlarged in diameter toward one another and in opposite directions, a series of vertical plates having holes therein and of approximately the same diameter as the largest part of said open ends and spaced apart and located between the latter, the holes in adjacent plates being in alinement, horizontal flange-like projections around said holes and normal to the plates, and twisted strips passing through the holes and flange-like projections, substantially as described.

In testimony whereof I affix my signature, in presence of two subscribing witnesses.

WILLIAM HENRY YARDLEY.

Witnesses:
LUTHER J. PARR,
CHAS. N. DANIELS.